(12) United States Patent
Gottfried

(10) Patent No.: US 8,203,252 B2
(45) Date of Patent: Jun. 19, 2012

(54) CLAMP AND LOCK PERMANENT MAGNETS WITHIN A ROTATING ELECTRICAL MACHINE USING PITCHED FOCUSED FLUX MAGNETS

(76) Inventor: Carlos Gottfried, México (MX)

( * ) Notice: Subject to any disclaimer, the term of this patent is extended or adjusted under 35 U.S.C. 154(b) by 355 days.

(21) Appl. No.: 12/452,852

(22) PCT Filed: Jul. 24, 2008

(86) PCT No.: PCT/US2008/009022
§ 371 (c)(1),
(2), (4) Date: Jan. 25, 2010

(87) PCT Pub. No.: WO2009/014742
PCT Pub. Date: Jan. 29, 2009

(65) Prior Publication Data
US 2010/0127584 A1    May 27, 2010

(51) Int. Cl.
*H02K 1/22* (2006.01)

(52) U.S. Cl. ............................ 310/261.1; 310/61
(58) Field of Classification Search ............. 310/156.01–156.84, 61, 261.1
See application file for complete search history.

(56) References Cited

U.S. PATENT DOCUMENTS

2004/0217667 A1* 11/2004 Popov .................. 310/156.57
2006/0043811 A1*  3/2006 Ong et al. ............ 310/156.08

* cited by examiner

Primary Examiner — Nguyen N Hanh
(74) Attorney, Agent, or Firm — Egbert Law Offices PLLC

(57) ABSTRACT

Permanent magnets are mounted within an electrical machine in a pitched saw-tooth pattern around the rotor shaft. This focused flux configuration provides for improved magnet mounting strength without resort to bonding or taping; provides improved rotor and stator cooling by access to the axial generator air flow; and provides for a simpler and more easily manufactured design. A laminated version of this basic structure provides for reduced surface losses and self-heating.

13 Claims, 9 Drawing Sheets

CLAMP AND LOCK PERMANENT MAGNETS WITHIN A ROTATING ELECTRICAL MACHINE USING PITCHED FOCUSED FLUX MAGNETS

BACKGROUND OF THE INVENTION

1. Field of the Invention

The present invention relates generally to devices and methods for assembling permanent magnet electrical machines, and more particularly to an apparatus and method for improving focused flux configured devices.

2. General Background and State of the Art

Permanent magnets make it reasonable to build electrical machines (defined here as motors and generators) using these for field generation rather than electro-magnets. Typically the magnets are mounted on an inner rotor, but outer rotor mounting is also used. In a generator, the rotation of the magnets on the rotor generates magnetic fields that induce voltages and currents in the windings of the radial outward stator. In a motor, the magnets react to voltages and currents applied to the stator and cause rotation of the rotor.

Permanent magnet electrical machines are more compact and simpler and require less maintenance than their electromagnetic brethren by not requiring rotor electromagnet windings. Modern Rare Earth magnets provide a much denser source of powerful magnetic flux than can windings, and have high flux and are capable of withstanding reasonably high temperatures. The resulting compact machines find application in structures where size, weight and efficiency are important, such as generators within the nacelles of wind power generators located on the top of high towers, or as motors where space is a premium.

Permanent magnets are mounted to the rotor in such a manner that the generated magnetic flux interacts with the stator coils. The standard surface mount configuration is to have the magnet poles parallel and circumferential to the surface, and the focused flux configuration has the magnets mounted with their poles perpendicular and circumferential to the rotor surface. As the magnetic flux is roughly proportional to the surface area of the magnet pole, the focused flux configuration can produce higher flux levels as the radial magnet pole side area can be made larger than that of the standard configuration having the same number of stator windings. Further, surface loss self-heating of focused flux machines are far lower than surface mount machines due to the reduced exposure of the magnet poles to induced flux variations.

One of the manufacturing issues related to focused flux machines is the mounting of the magnets to the rotor in a manner that contains the centripetal forces on the magnets due to the rotor rotation in normal operation. Conventionally, focused flux magnets are mounted by bonding, banding (with a non-ferrous material such as fiberglass, carbon fiber or Kevlar tape) or gripping them to the rotor surface. A novel means to mount focused flux magnets, the subject of this invention, improves on the manufacturing issue as well as increasing cooling and making the electrical machine easier to assemble.

SUMMARY OF THE INVENTION

Accordingly, it is an object of this invention to provide an improved mounting of focused flux permanent magnets to the surface of the rotor of an electrical machine.

A further object of this invention is to provide improved rotor cooling.

A further object of this invention is to provide improved assembly of an electrical machine.

Further objects and advantages of the present invention will become more apparent from the following description of the preferred embodiments, which, taken in conjunction with the accompanying drawings, will illustrate, by way of example, the principles of the invention.

BRIEF DESCRIPTION OF THE DRAWINGS

The foregoing and other objects, aspects and advantages will be better understood from the following detailed description of the preferred embodiments of the invention with reference to the drawings in which.

DETAILED DESCRIPTION OF THE PREFERRED EMBODIMENTS OF THE INVENTION

In the following description of the present invention, reference is made to the accompanying drawings, which form a part thereof, and in which are shown, by way of illustration, exemplary embodiments illustrating the principles of the present invention and how it may be practiced. It is to be understood that other embodiments may be utilized to practice the present invention and structural and functional changes may be made thereto without departing from the scope of the present invention.

Figure 1:
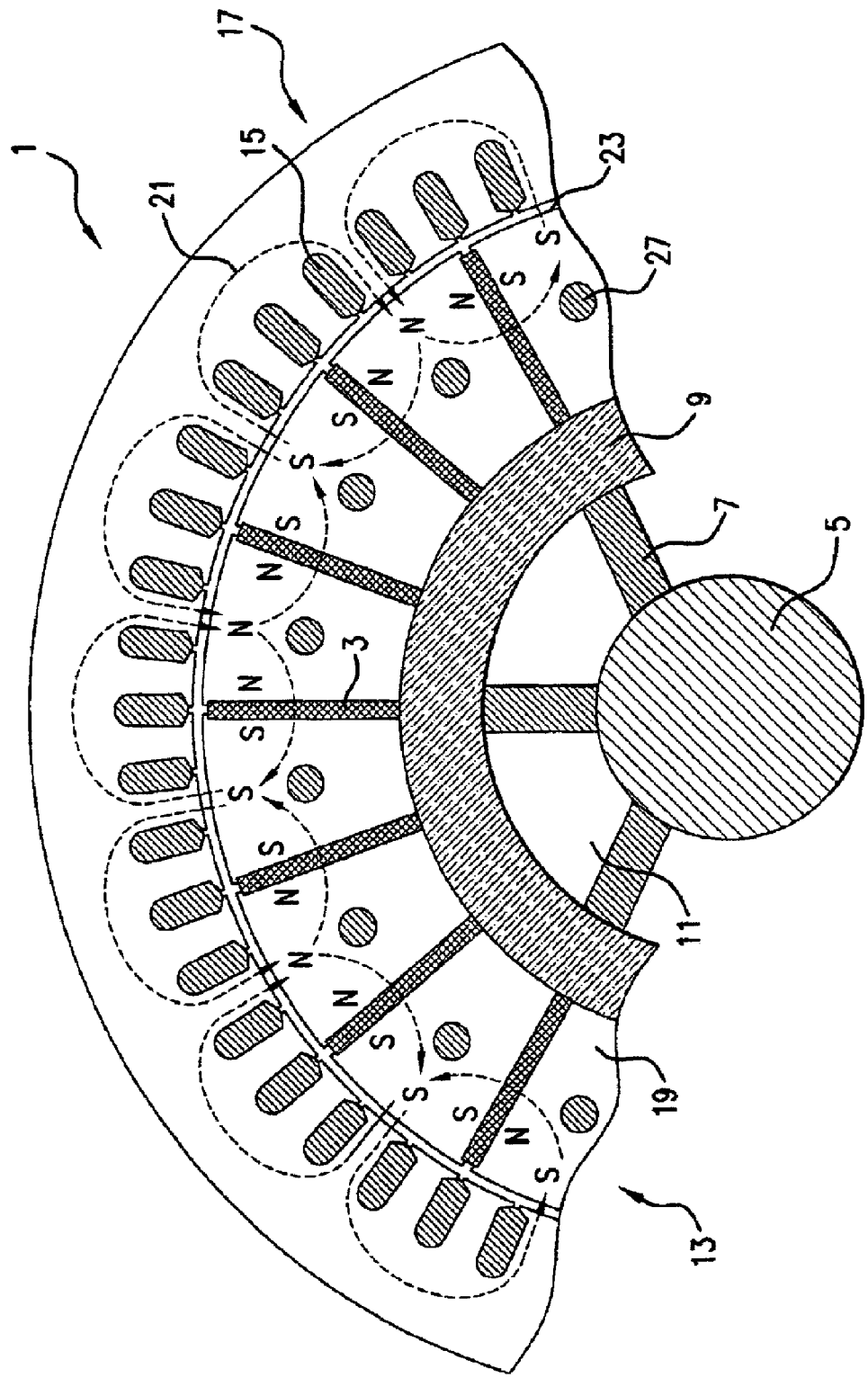
FIG. 1 illustrates, in radial cross section, the conventional manner of mounting focused flux magnets.

Conventional Focused Flux Magnet Mounting, Cooling and Assembly: FIG. 1 illustrates the conventional mounting 1 of focused flux mounted magnets 3. Mounted to the generator or motor shaft 5 through its struts 7 is a non-ferrous inner support ring 9, and between the struts 7 are a series of axial cooling vents 11 through which cooling air is blown through the generator. In a generator, the magnets 3 in the turning rotor 13 induce voltage and current in the windings 15 of the outer stator 17; in a motor the voltage and current in the windings 15 of the stator 17 react with the magnets 3 of the rotor 13 and cause it to rotate. The magnets 3 are circumferentially separated by ferrous pole pieces 19 providing a means to conduct the magnetic flux 21 through the surface 23 of the rotor 13 onto the magnet 3 poles, and to capture the magnets 3 by overlapping them. The pole pieces 19 and constrained magnets 3 are held to the inner support ring 9 by being bonded to it and by circumferential banding.

Figure 2:
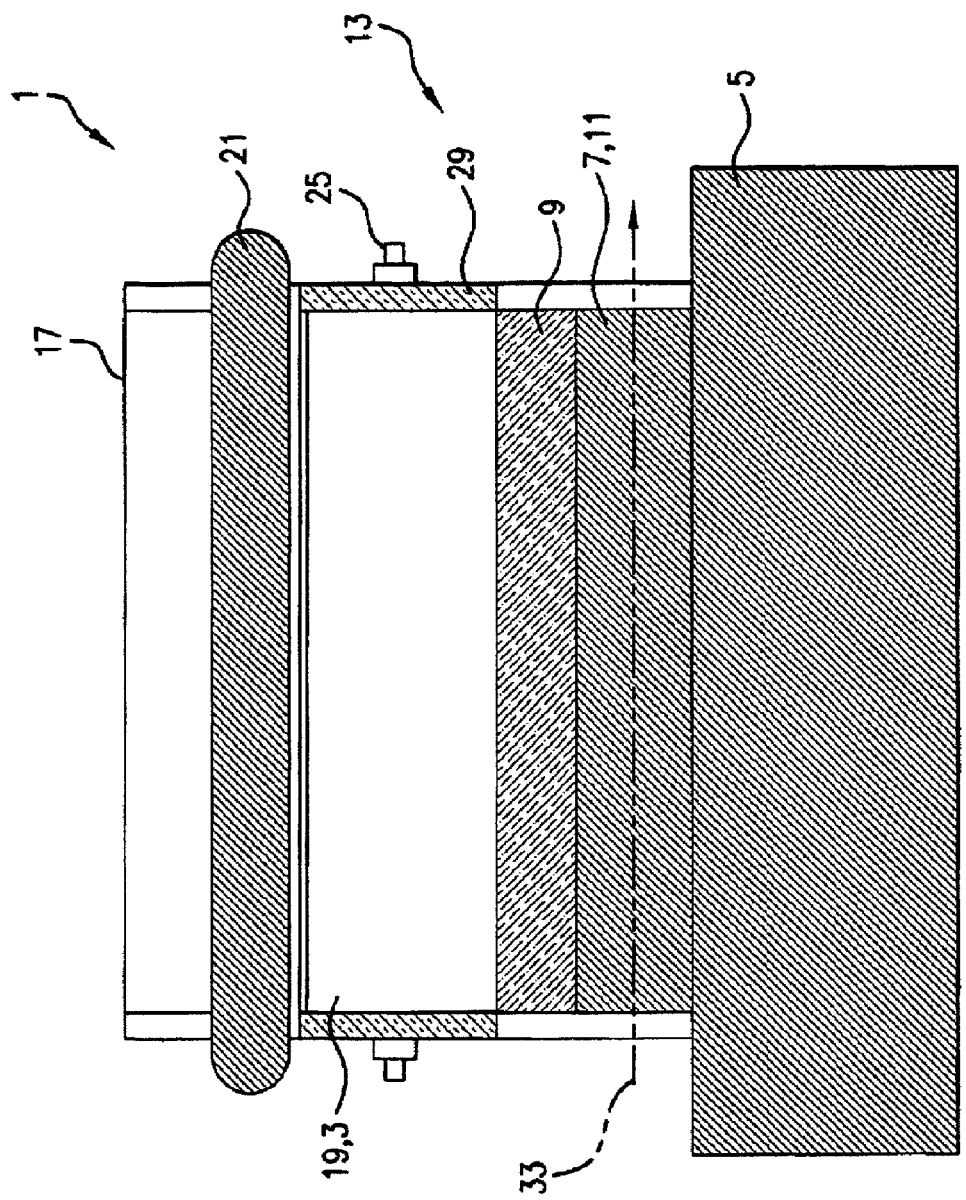
FIG. 2 illustrates, in axial cross section, the conventional manner of mounting focused flux magnets.

As illustrated in FIG. 2, the pole pieces 19 are further held to the inner ring 9 using ferrous pins 25 passing axially through the rotor 13 via holes 27 in the pole pieces 19 and ending in non-ferrous end caps 29.

High rotor speeds cause the centrifugal force to bend the pins 25 toward the axial midpoint of the rotor 13 regardless of the bonds or banding, and limits the machine size. The present invention uses an integral structure to mitigate this issue.

Cooling of conventional generators is performed by flowing air axially 33 through the central axial vents 11. As the inner support ring 9 blocks radial air flow from the cooling vents 11, the air flow cools the inner support ring 9 and only weakly and indirectly cools the magnets 3 and pole pieces 19, and the stator 17 is not cooled. The present invention provides enhanced air flow directly around the magnets and through the rotor and stator for direct cooling and mitigates this issue.

Assembly of conventional focused flux machines 1 is awkward. As the magnets 3 and pole pieces 19 are added, the magnets 3 are strongly drawn to or repulsed from each other and the ferrous pole pieces 19, and special fixtures are needed to keep them from flying off or ending up stuck together. The present invention provides for simpler assembly by working with the magnetic forces and mitigates this issue.

Figure 3:
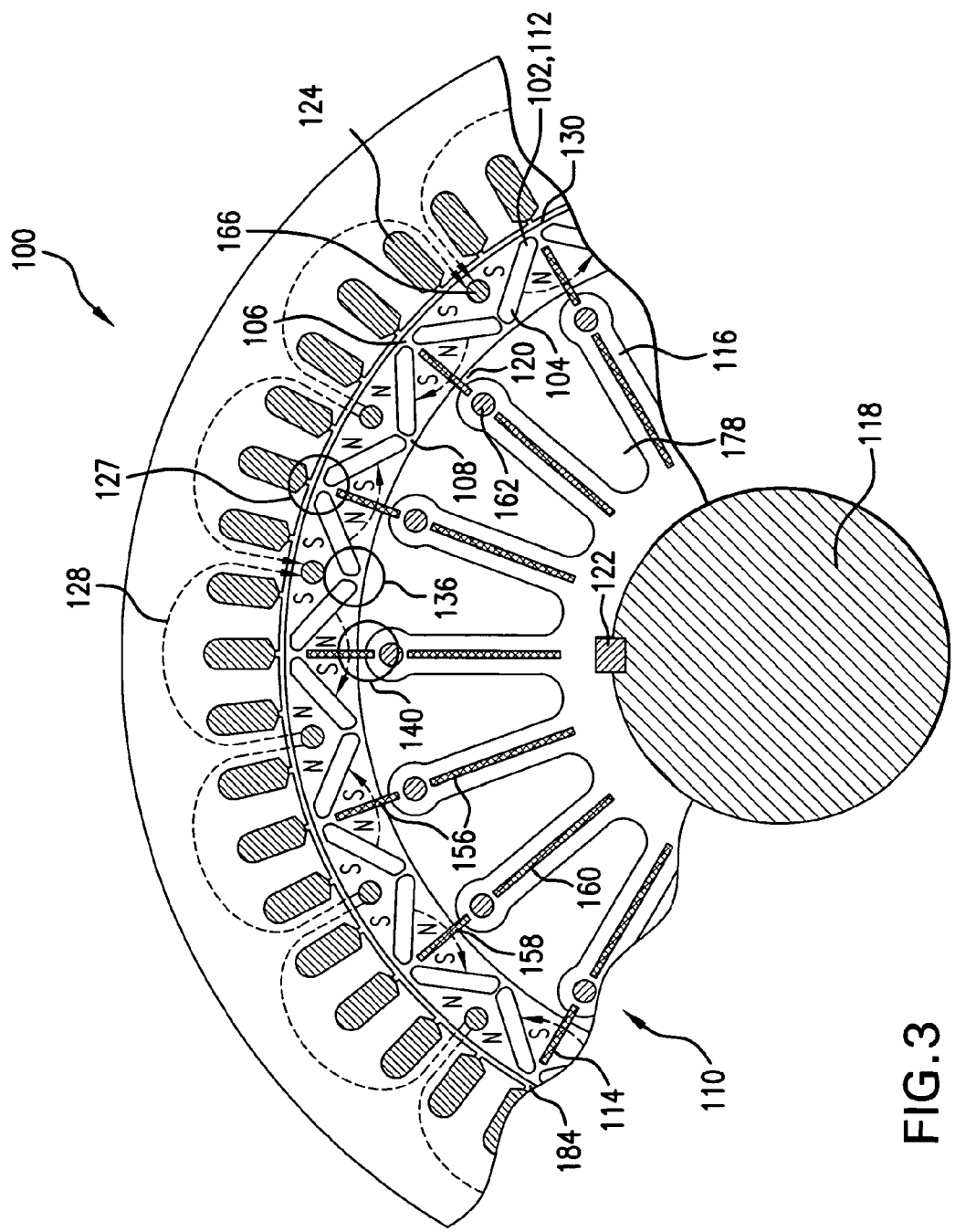
FIG. 3 illustrates, in radial cross section, a manner of mounting pitched focused flux magnets, in accordance with an embodiment of the present invention.

A Novel Focused Flux Magnet Mounting Using Pitched Magnets: Illustrated in FIG. 3 is an improved means 100 to mount focused flux magnets. Rather than a radial installation, the magnets 102 are pitched to form a saw tooth pattern 104 having peaks 106 and valleys 108 around the circumference of the rotor 110. This saw tooth pattern 104 is formed by axially inserting the magnets into pitched slots 112 within a ferrous support ring 114. Spokes 116 leading from the shaft 118 hold the magnet support ring 114 and connect midway between the valleys 108 using narrow metal isthmus formations 120. Spokes 116 can be of a ferrous material allowing the formation of one continuous pattern that includes the support ring 114 and can be cut from a solid block or built into a pattern of laminations (laminations have the significant advantage of reducing eddy currents and other surface losses that cause heating). Separate pole pieces 19 are not required, and a locking pin 122 holds the spoke 116 pattern to the rotor shaft 118. This structure provides greater resistance to centrifugal forces by its continuous and integral structure.

Figure 4:
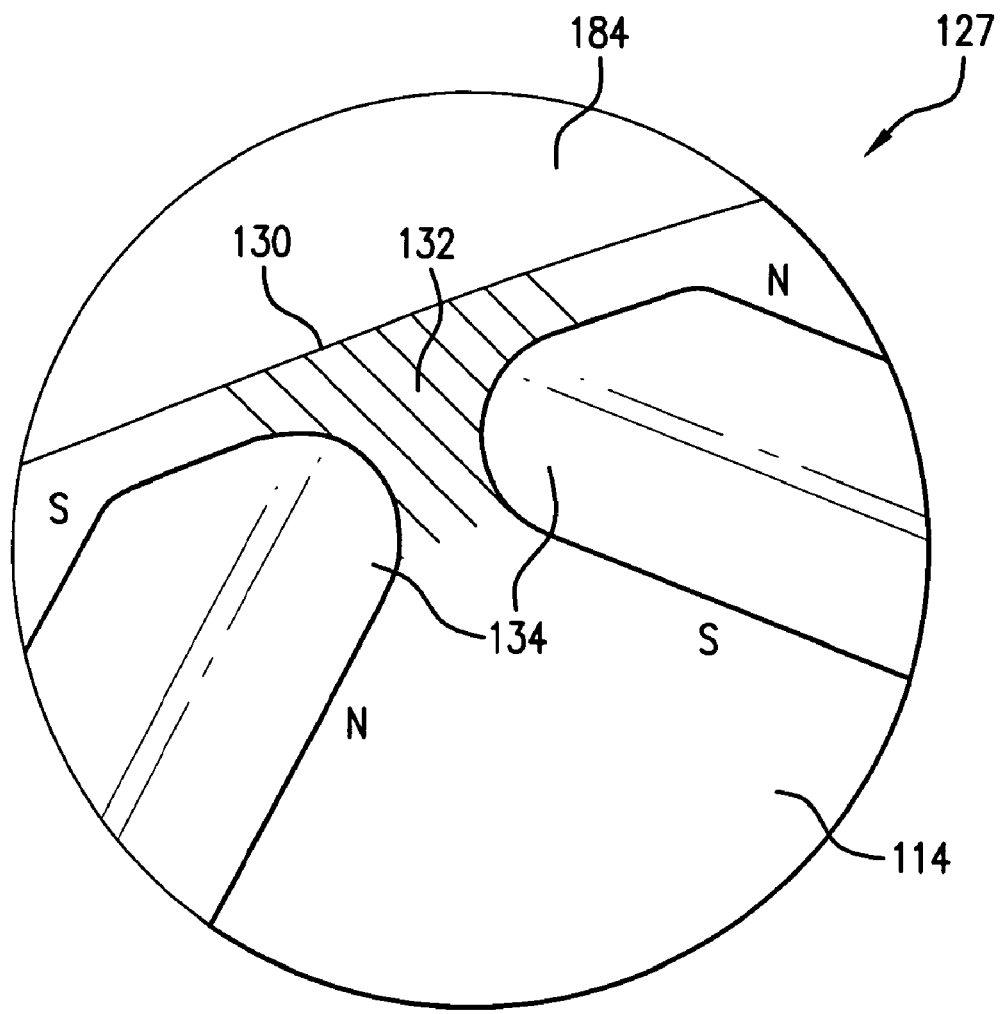
FIG. 4 illustrates an expanded view of an active flux region, in accordance with an embodiment of the present invention.

As illustrated in FIG. 4, the region including the pitched peaks 106 is the flux active region 127 where flux 128 is leaving the rotor surface 130, and there is some flux leakage here as adjoining magnets 134 have opposite polarity. This leakage is minimized by making the connecting bridge 132 small so that it is in flux saturation and forms a high impedance to further flux leakage.

Figure 5:
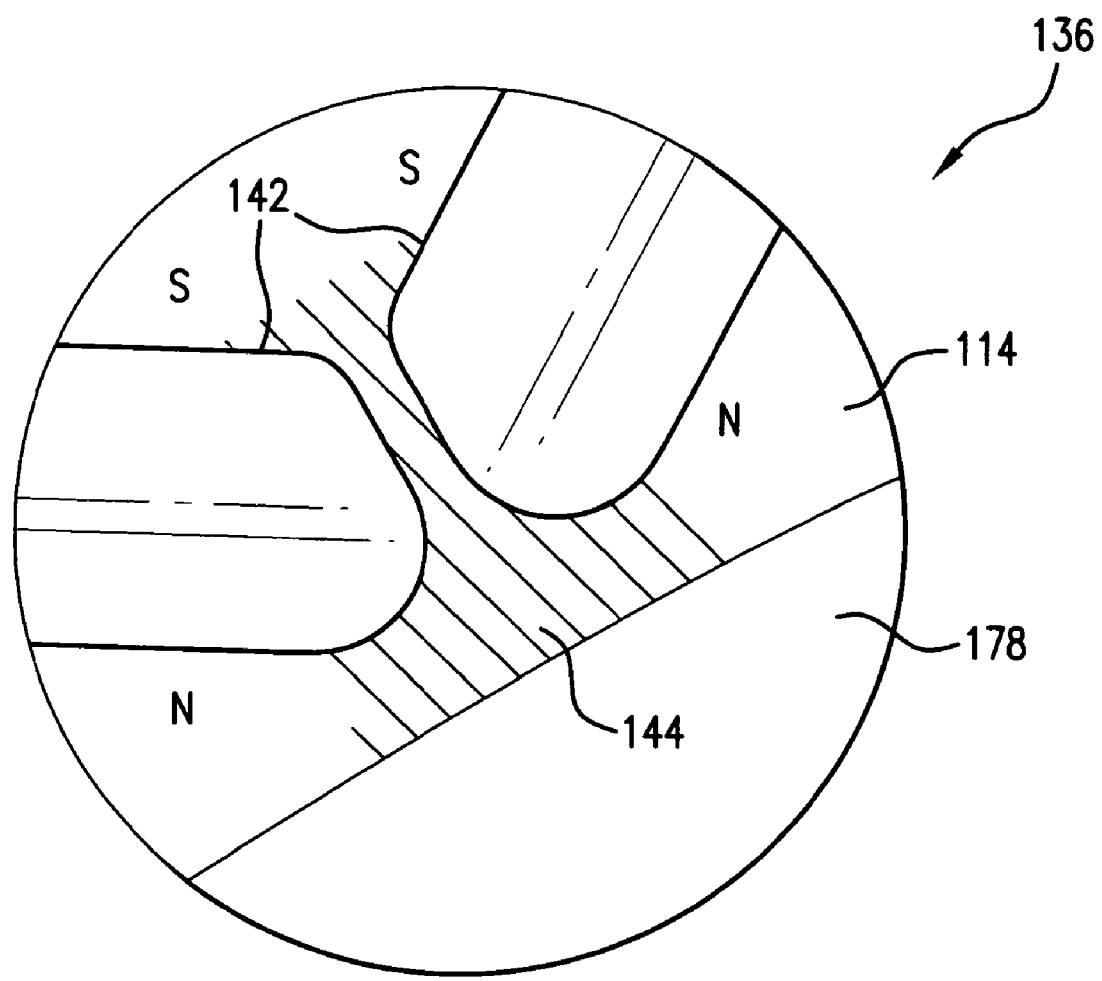
FIG. 5 illustrates an expanded view of an inactive flux region, in accordance with an embodiment of the present invention.

As illustrated in FIG. 5, the region including the pitched valleys 108 is the flux inactive region 136 where flux 128 remains within the support ring 114. Although theoretically there is no flux leakage between adjoining magnets 142 as they have the same polarity, practically magnets differ and there will be some leakage. This leakage is minimized by making the connecting bridge 144 small so that it is in magnetic saturation and forms a high impedance to further flux leakage.

Figure 6:
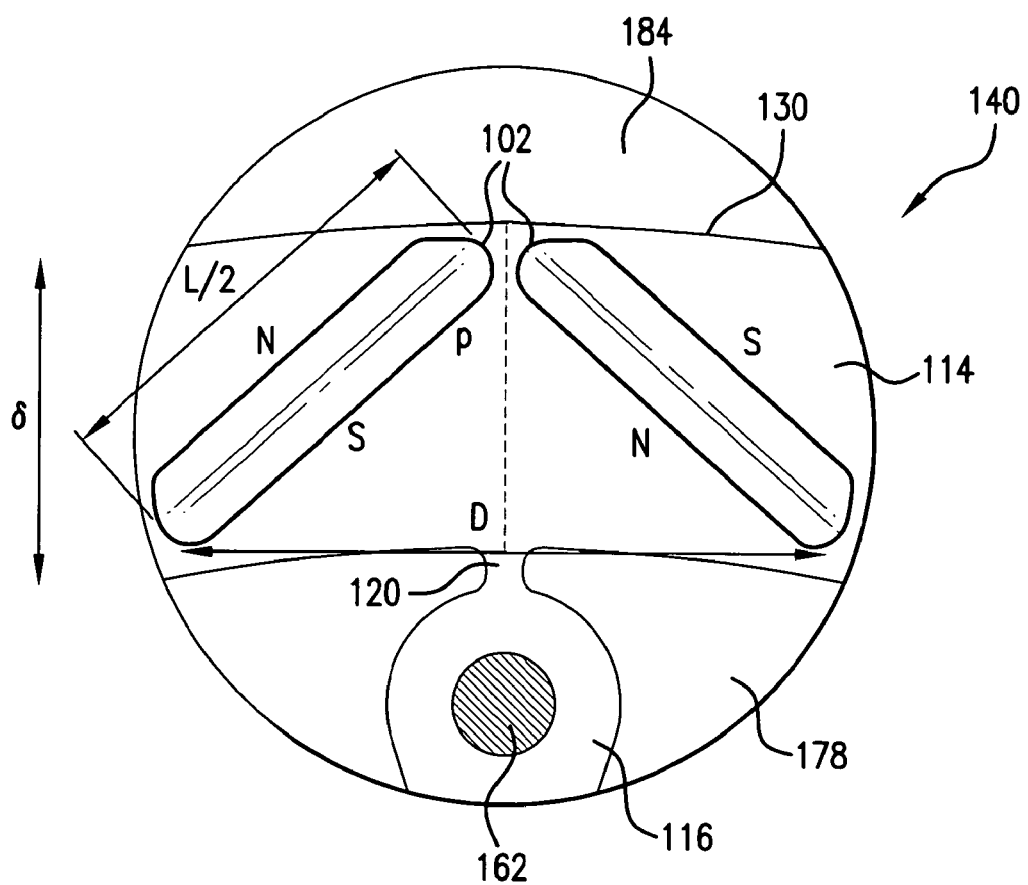
FIG. 6 illustrates an expanded view of a spoke as it attaches to a magnet support region, in accordance with an embodiment of the present invention.

Although the spokes 116 are placed in the neutral flux region 140 midway between the valleys 108 where the flux 128 is primarily circumferential and there theoretically should be no leakage, practically some flux 128 will leak into the spokes 116. As illustrated in FIG. 6, the spokes 116 are connected to the support ring 114 using a narrow isthmus 120 to minimizes leakage. The isthmus 120 easily flux-saturates and forms a high impedance to further flux.

Figure 7:
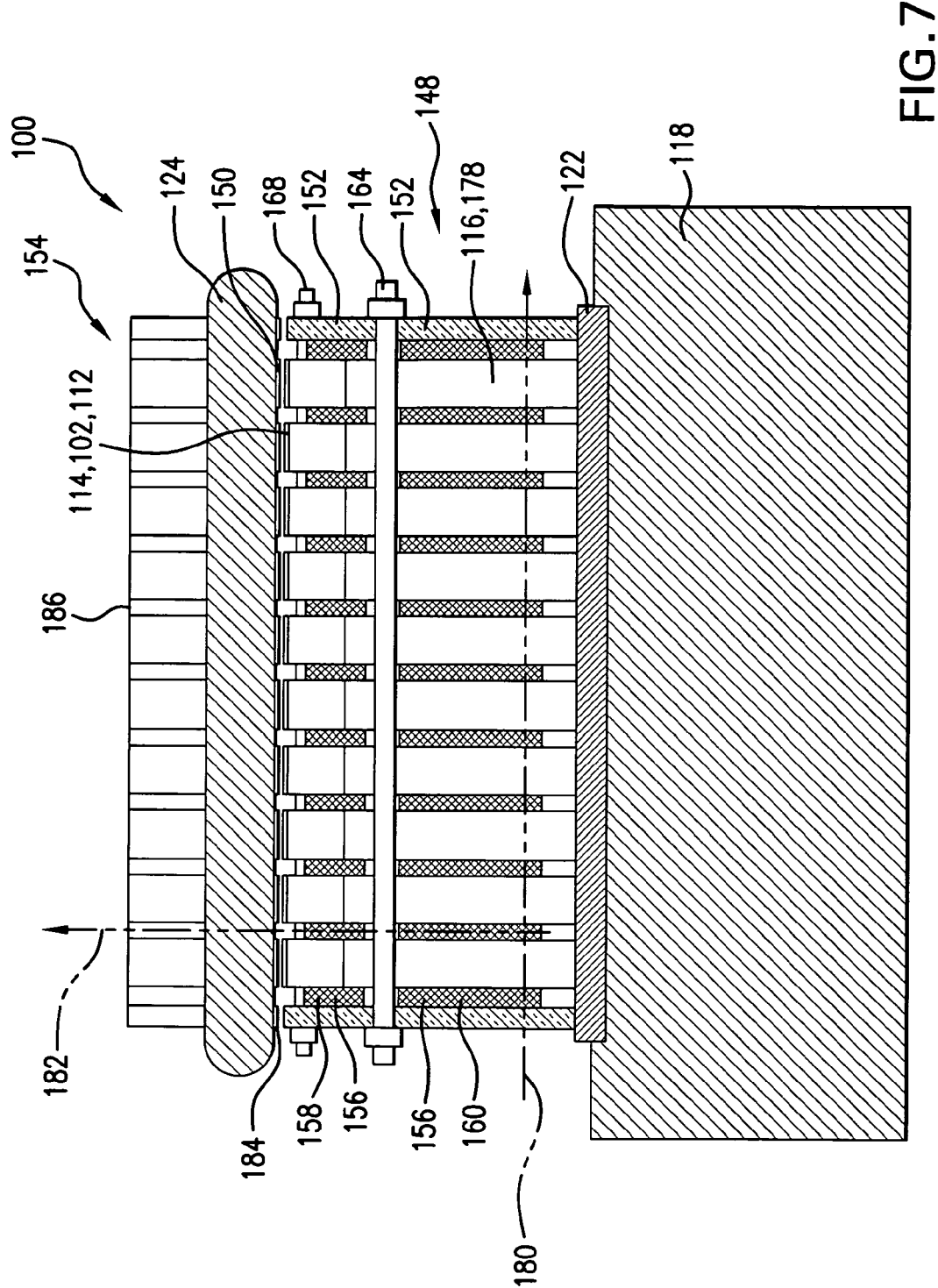
FIG. 7 illustrates, in axial cross section, a manner of mounting focused flux pitched magnets, in accordance with an embodiment of the present invention.

As illustrated in FIG. 7, the machine core 148 is formed in segments 150 with non-ferrous endplates 152 lacking slots 112 onto which radial segment spacers 156 are adhered. Further, the segmentation, spacing, radial air vents, and lamination of the rotor is continued in the stator 154.

Figure 8:
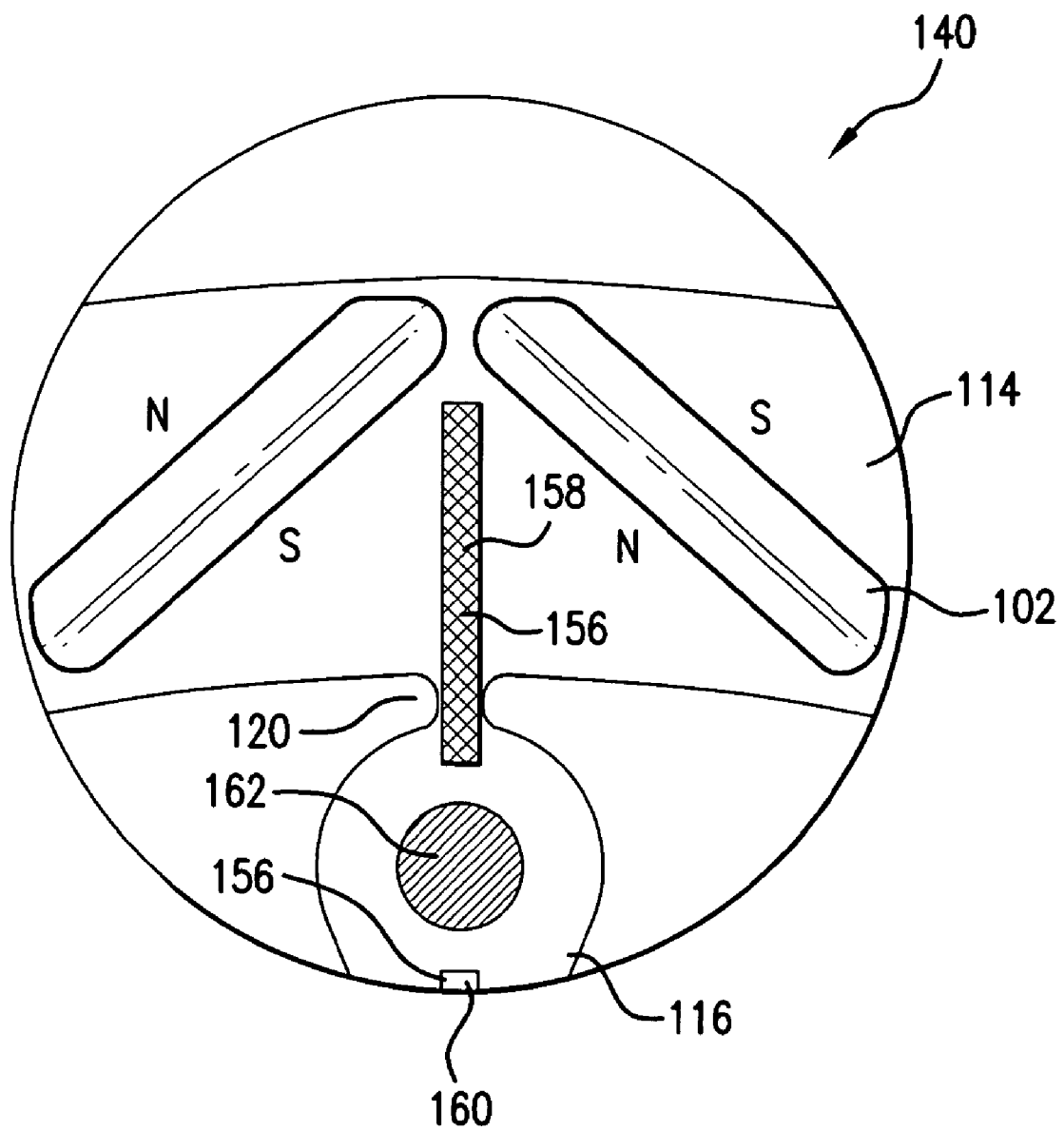
FIG. 8 illustrates an expanded view of a spoke as it attaches to a magnet support region including spacers, in accordance with an embodiment of the present invention.

As illustrated in FIG. 7 and FIG. 8, the spacer 156 is partly formed by a non-ferrous outer spacer 158 reaching from the support ring 114 to the spoke pin hole 162 across the connecting isthmus 120. Outer spacer 158 further strengthens the isthmus 120 while not short circuiting the flux 128. The spacer 156 is completed by an inner spacer 160 from the spoke pin hole 162 radially inwards that can be ferrous. The core 148 is completed by ferrous spoke pins 164 that compress the segments 150 against each other and against non-ferrous end caps 152.

For very high rpm machines, a support ring pin hole 166 and associated support ring pin 168 with non-ferrous end caps 152 are provided to further support the magnets 102.

Figure 9:
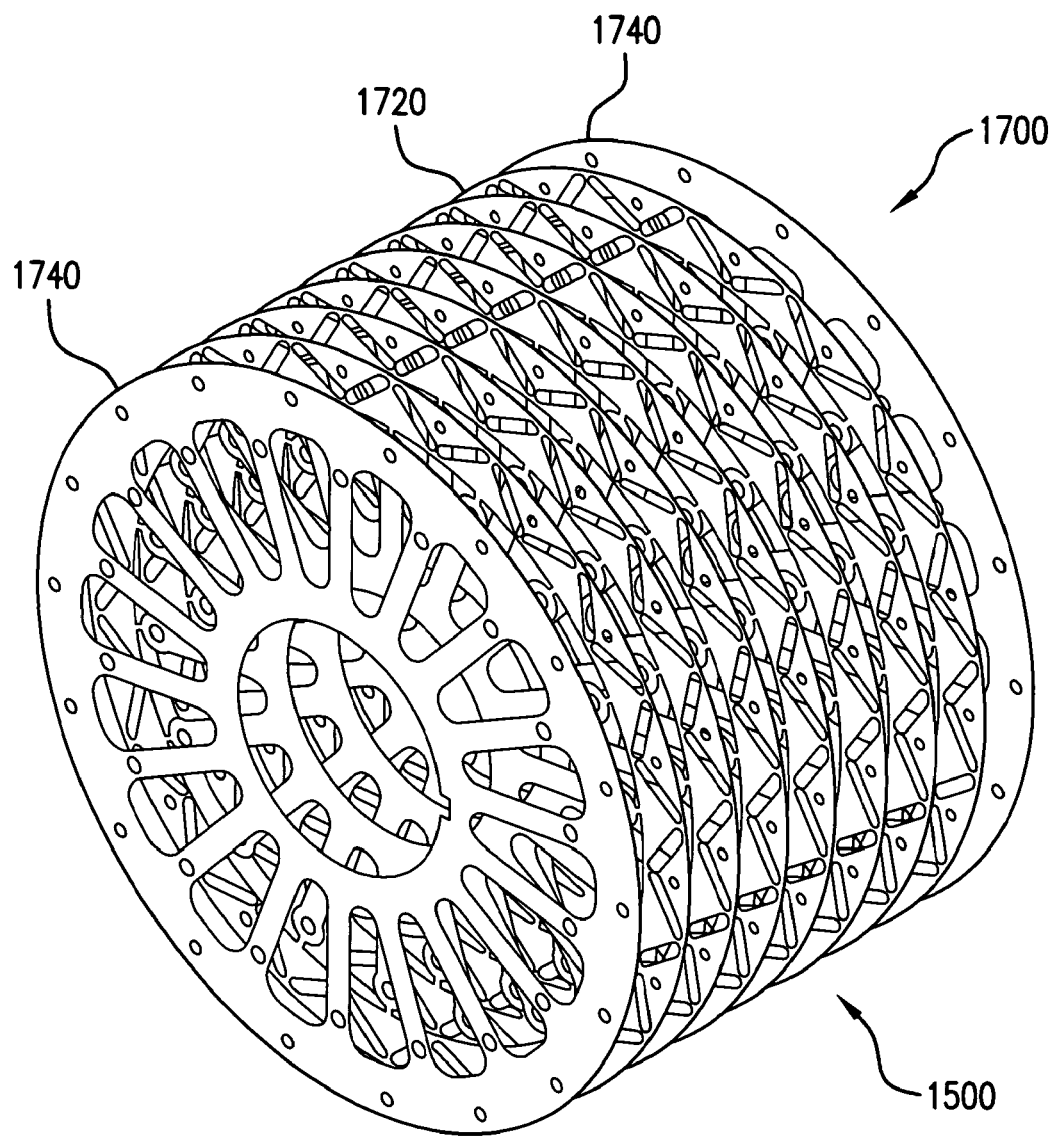
FIG. 9 illustrates a three dimensional view of a laminated rotor, in accordance with an embodiment of the present invention.

As illustrated in FIG. 9, a laminated rotor construction 170, having much lower surface losses and self-heating, forms the segments 150 using ferrous slotted 112 laminations 172 with non-ferrous un-slotted bookend laminations 174. These are sub-assembled into segments 150 with a few bond points or spot welds along its circumference, and the spacers 156 adhered to a bookend 174.

Greater weight efficiency: FIG. 1 and FIG. 3 represent two essentially electrically identical rotors having the same overall rotor diameter, stator windings, and magnetic flux. FIG. 1 is a conventional focused flux machine 1 having magnets 3 of length L spaced D apart, and FIG. 3 is a pitched focused flux machine 100 having magnets 102 of length L/2 and spaced D apart. Ignoring the curvature affect of having to wrap around the rotor, the geometry of the improved focused flux machine 100 is shown in FIG. 6. Assuming L>D, the pitch angle of the saw tooth pattern 104 is $$\sin r = \frac{D}{L}$$

and the thickness of the magnet support ring 114

$$\delta = \frac{L}{2}\cos r$$

is less than half the thickness of the pole pieces 19 of the conventional focused flux machine 1. The reduction in rotor thickness implies the improved design 100 has much less material than the conventional and higher weight efficiency.

Improved Assembly: Assembly is made easier as the magnets 102 will pull themselves into and center themselves within the slots 112 without the need for special fixtures. They do this by balancing the attraction to the magnetic support ring 114 ferrous material vs. their attraction/repulsion from magnets 102 already installed.

Improved Cooling: As illustrated in FIG. 7, the pitched magnet generator core 148 is formed from the layered segments 150 separated by spacers 156. As this structure does not require an air flow blocking inner support ring 9, it allows substantial axial cooling air 180 to flow from the axial vents 178 radially outward 182 through the circumferential gaps between the spacers 156. This way the heat producing magnets 102 and heated support ring 114 are directly cooled.

The improved cooling applies to the stator 154 and its windings 124 as it is also cooled by the radially moving air 182 passing into the rotor-stator air gap 184 and through the stator 154 via its radial air vents 186.

ALTERNATIVE EMBODIMENTS

While several illustrative embodiments of the invention have been shown and described, numerous variations and alternate embodiments will occur to those skilled in the art. Such variations and alternate embodiments, as well as others, are contemplated and can be made without departing from the spirit and scope of the invention as defined in the appended claims.

What is claimed is:

1. An apparatus comprising:
   at least a pair of permanent magnets;
   an electrical machine having a rotor shaft;
   a support ring having at least a pair of recessed slots pitched at angles from lines radiating from a center of said rotor shaft; and
   a plurality of circumferentially-spaced spokes connecting said support ring to said rotor shaft, the permanent magnets respectively inserted into the recessed slots of said support ring, the spokes having axial vents formed within circumferential spaces between through spokes, said support ring being axially segmented in which each segment is separated from an adjacent segment by radial spacers.

2. The apparatus of claim 1, the recessed slots forming a sawtooth pattern around a circumference of said support ring.

3. The apparatus of claim 1, said radial spacers suitable for passing cooling air from the axial vents.

4. The apparatus of claim 1, said support ring formed of a plurality of laminations.

5. A method of holding at least two permanents magnets onto a spinning rotor shaft of an electrical machine, the method comprising:
   forming a support ring having at least two recessed slots pitched from a line extending radially from a center of the rotor shaft, said support ring being axially segmented such that each segment is separated from an adjacent segment by radial spacers;
   locking circumferentially-spaced spokes to the rotor shaft such that said circumferentially-spaced spikes extend therefrom;
   providing axial vents so as to pass cooling air in circumferential spaced between the spokes; and
   inserting the permanent magnets respectively into the recessed slots.

6. The method of claim 5, said recessed slots arranged in a sawtooth pattern around a circumference of said support ring.

7. The method of claim 5, further comprising:
   passing radial cooling air from axial vents formed in axial spaces between the segments.

8. The method of claim 5, further comprising:
   passing rotor radial cooling air through stator radial air vents.

9. The method of claim 5, the step of forming the support ring comprising:
   forming the support ring from a plurality of laminations.

10. An electrical machine comprising:
    a rotor;
    a support ring having at least two recessed slots pitched from a line extending radially from a center of said rotor, said support ring being axially segmented such that each segment is separated from an adjacent segment by radial spacers;
    a plurality of circumferentially-spaced spokes locked to said rotor shaft and extending therefrom, said support ring having axial vents for passing cooling air within circumferential spaces between the spokes; and
    a plurality of magnets respectively inserted into the recessed slots such that the magnets are held to said rotor.

11. The electrical machine of claim 10, said support ring having a plurality of recessed slots arranged in a sawtooth pattern.

12. The electrical machine of claim 10, the spaces between the recessed segments arranged so as to pass the cooling air from said axial vents.

13. the electrical machine of claim 12, said support ring being formed of a plurality of laminations.

\* \* \* \* \*